Jan. 21, 1964 — T. KICENIUK — 3,118,639
CONTROL AND PROPULSION FLUID FOIL
Filed Dec. 5, 1961 — 2 Sheets-Sheet 1

INVENTOR.
TARAS KICENIUK
BY
Lyon & Lyon
ATTORNEYS

Jan. 21, 1964  T. KICENIUK  3,118,639
CONTROL AND PROPULSION FLUID FOIL
Filed Dec. 5, 1961  2 Sheets-Sheet 2
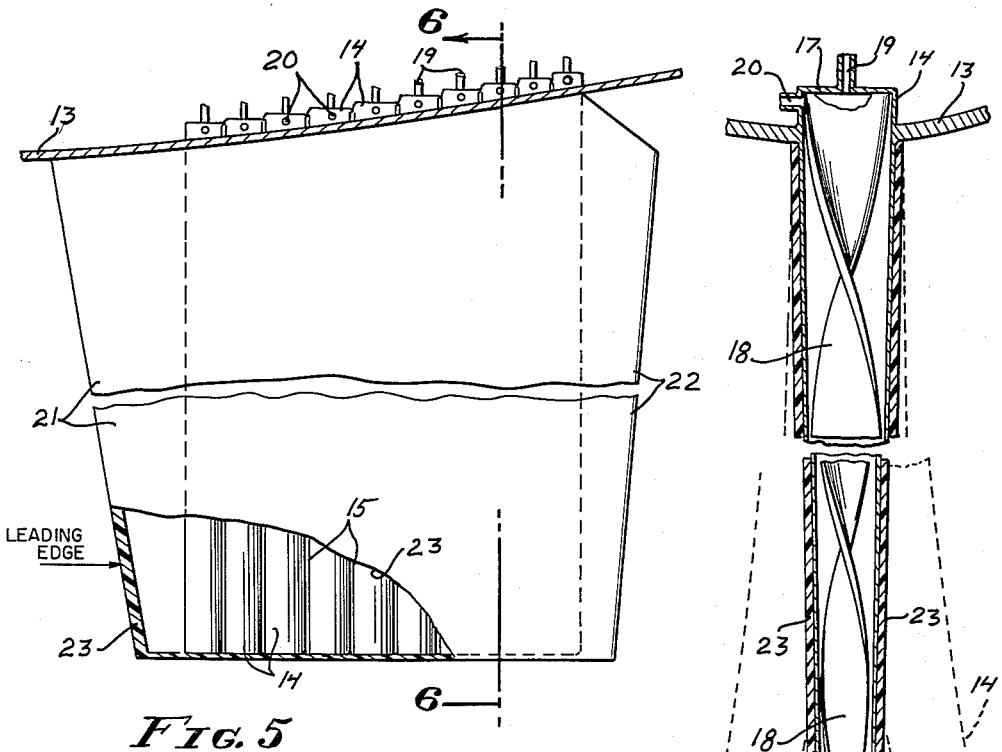
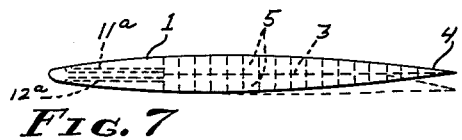
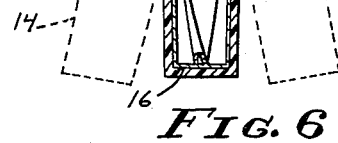
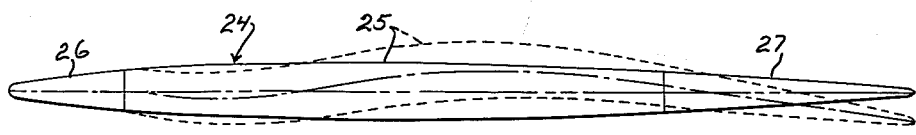
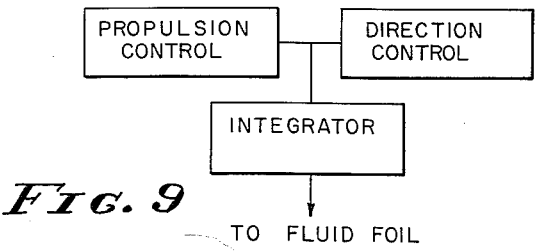
INVENTOR.
TARAS KICENIUK
BY Lyon Lyon
ATTORNEYS

United States Patent Office 3,118,639
Patented Jan. 21, 1964

3,118,639
CONTROL AND PROPULSION FLUID FOIL
Taras Kiceniuk, Altadena, Calif., assignor to California
Institute Research Foundation, Pasadena, Calif., a corporation of California
Filed Dec. 5, 1961, Ser. No. 157,126
10 Claims. (Cl. 244—44)

This invention relates to control and propulsion foils, that is, to fluid foils which by change in shape operate to steer or propel a vehicle in water or air.

Included in the object of this invention are:

First, to provide a foil construction which utilizes fluid pressure applied within cells contained in the foil construction in a manner to cause the foil warp so as to change the amount of lift force acting on the foil, permitting it to function as a control means, or which by application of variable pressures to a series of cells to produce an undulating movement so as to function as a propulsion means, in the latter case utilizing the principles of propulsion analogous to that of fish and sea animals, as reported in the Journal of Fluid Mechanics, vol. 10, pp. 321–344, 1961, by Dr. T. Yao-Tsu Wu.

Second, to provide a foil construction altering the lift produced by a foil which eliminates the need of a shaft or other mechanical connection which reciprocates or rotates and must, therefore, extend from the supporting body into the foil through a packing gland or the like; instead, a portion, such as the leading portion of the foil construction may be rigidly attached to the body of the vehicle and carry conduits through which hydraulic force may be applied.

Third, to provide a foil construction which in one form comprises a set of upper and lower cells sharing a common wall disposed in the neutral axis of the foil construction and having distal walls which are deformed in shape so as to lengthen or contract the bounding surface when pressure is applied or removed from the respective cells, so as to cause the foil to warp, the distal sides of the cells being covered with an elastomer adapted to expand or contract while presenting a smooth outer surface.

Fourth, to provide a foil construction another form of which utilizes a series of cells attached side by side and having twisted pressure tubes therein which, when pressurized, tends to warp the cells thereby in turn to warp the foil.

With the above and other objects in view as may appear hereinafter, reference is directed to the accompanying drawings in which:

FIGURE 5 is a fragmentary plan view with portions shown in section illustrating a modified form of the control and propulsion foil.

FIGURE 6 is a fragmentary substantially diagrammatical sectional view taken through 6—6 of FIGURE 5.

FIGURE 7 is a diagrammatical end view showing a further modification of the control and propulsion foil.

FIGURE 8 is a substantially diagrammatical end view showing a still further modification of the control and propulsion foil.

FIGURE 9 is a block diagram illustrating the manner in which distortion or flexing of the foil may be controlled.

Figure 1:
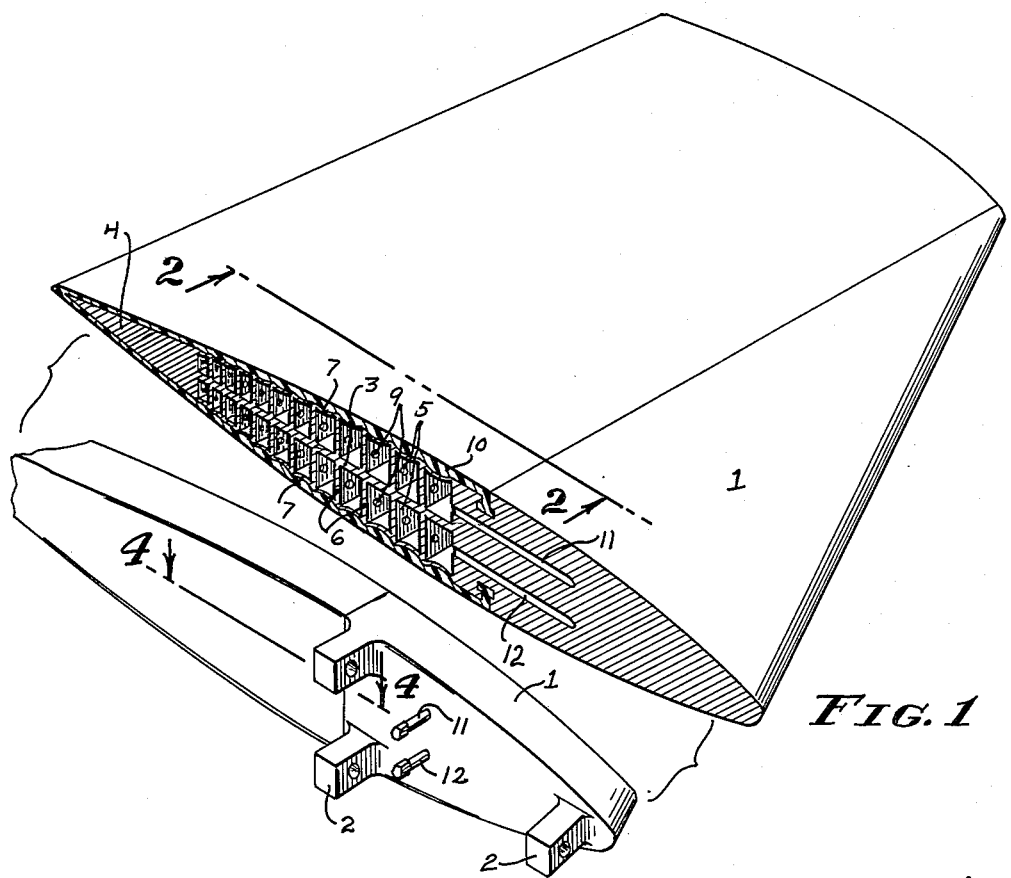
FIGURE 1 is a perspective view showing one form of the control and propulsion foil with a section thereof cut away so as to illustrate a portion thereof in cross section, the sectional view being essentially diagrammatical.

Reference is first directed to FIGURES 1 through 4. In the construction here illustrated, the fluid foil includes a leading edge structure 1 which for the purpose of simplifying the illustration is shown as solid, but which in fact may be a hollow structure with appropriate ribs and other reinforcing depending upon the size and the use for which the fluid foil is intended. Also for purposes of illustration, the leading edge structure is shown as provided with mounting means 2 in the form of lugs or bosses for attachment to a body, hull or fuselage structure as the case may be.

Extending rearwardly from the end structure is a median wall 3, the rear edge of which is joined to a trailing edge structure 4 which is also shown as solid to simplify the illustration, but may comprise appropriate framework depending upon the size of the foil. Formed in pairs on opposite sides of the median wall 3 are two groups of cells 5 which are essentially square or rectangular. Adjacent cells have common lateral walls 6. The wall 7 of each cell opposite from the median wall 3 is concave and flexible so that on the application of pressure within the cell, the wall 7 tends to straighten, spread the lateral walls 6 and curve the median wall 7.

Figure 4:
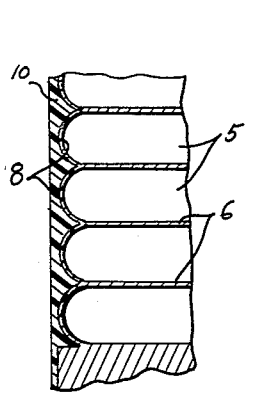
FIGURE 4 is a fragmentary, sectional view through 4—4 of FIGURE 1.
Figure 2:
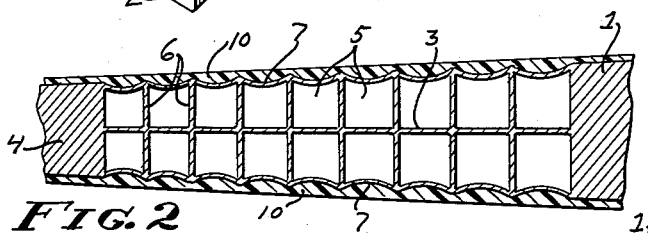
FIGURE 2 is a fragmentary, substantially diagrammatical view through 2—2 of FIGURE 1 showing the flexing portion of the control and propulsion foil in its neutral position.

The ends of each cell are closed by end walls 8 such as indicated in FIGURE 4. The lateral or dividing walls 6 between the cells 5 are provided with perforations 9 so that two groups of cells on opposite sides of the median wall 3 may contain a common fluid and may be subject to a common pressure.

The distortable or concave walls 7 of the cells 5 are provided with a yieldable cover 10 which may continue over the surfaces of the trailing edge structure 4.

The two groups of cells 5 on opposite sides of the median wall 3 are connected to pressure fluid supply ducts 11 and 12, respectively, which extend into the leading edge structure 1, then extend through the supported end of the fluid foil into the body structure to which the foil is attached.

Figure 3:
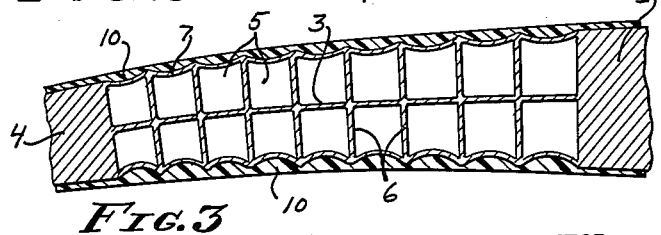
FIGURE 3 is a similar fragmentary and substantially diagrammatical view showing the flexing portion in a distorted position.

Operation of the control and propulsion foil illustrated in FIGURES 1–4 is as follows:

In the arrangement illustrated, the foil is intended primarily as a control. Foil pressure fluid is supplied through the ducts 11 and 12. The relative pressures in the two ducts and consequently in the two groups of cells 5 is determined by a suitable sensing means not shown or is manually controlled through suitable servo means. If the pressure in one of the ducts and correspondingly in one of the groups of cells 5 is greater than in the other, the fluid foil will tend to warp in the direction of the group of cells having the lesser pressure as shown in FIGURE 3. The yieldable cover 10 stretches or compresses so as to present a smooth, outer surface.

While the cells 5 are shown as divided into only two groups interconnected by perforations 9, it should be understood that the cells may be individually connected to supply ducts so that the pressure in each cell or each subgroup of cells may be individually controlled. Such an arrangement permits, for example, sinuous movement of the foil which when controlled by a suitable programming means produces a propulsion effect which will be discussed in more detail hereinafter.

Reference is now directed to FIGURES 5 and 6. In the construction here illustrated, there is indicated fragmentarily a supporting body or hull 13 which is pierced by a plurality of tubular cells 14 which project laterally from the hull. The cells are tangent to each other and are welded or otherwise joined along their lines of tangency as indicated by 15. The ends 16 and 17 of each cell are closed. Mounted in each cell is a twisted Bourdon tube 18, the ends of which are joined to the ends 16 and 17 of the corresponding cell.

The inboard end of each Bourdon tube is connected to a pressure fluid supply duct 19 and the inboard end of each cell surrounding the tube is connected to a fluid pressure supply duct 20.

As in the first described embodiment, the leading edge of the row of tubular cells is provided with a leading edge structure 21 and the trailing margin of the cells is provided with a trailing edge structure 22.

A flexible covering 23 encases the cells 14 and may also encase the leading and trailing structures 21 and 22.

Operation of the embodiment shown in FIGURES 5 and 6 is as follows:

By reason of the fact that all of the tubular cells 14 are joined to the supporting body or hull, it follows that only the outboard portions of the cells are capable of distorting. When pressure fluid is applied to the Bourdon tubes 18, their extremities tend to twist so as to exert a torque at the outboard ends of the tubular cells. The cell walls are relatively thin and the lengths of the cells are large in comparison to their diameter so that their outboard ends tend to deflect laterally in one direction or the other as indicated in FIGURE 6 depending upon the relative pressure inside the Bourdon tubes and in the space between the Bourdon tubes and the walls of the cell. The distortion is cumulative, beginning at the leading cell, that is, the leading edge structure 21 is rigid so that the leading cell can twist only a small amount about its longitudinal connection 15. The next cell is capable of a slightly greater degree of deflection and so on progressively to the trailing edge cell. As a consequence the fluid foil deflects greatest at its outboard end and deflects proportionately a lesser amount toward its inboard end.

In the construction shown in FIGURES 5 and 6, pressure fluid may be supplied simultaneously to all of the Bourdon tubes and all of the cells surrounding the Bourdon tubes in the manner of the first-described structure. Alternatively, fluid may be supplied individually to the various cells and their tubes according to any appropriate control signal.

More particularly, by connecting the cells of the structure shown in FIGURES 1–4 or FIGURES 5 and 6 individually to pressure sources in such a manner that the pressure in each cell may be individually determined the fluid foil may be caused to undulate or produce a sinuous movement as indicated by dotted lines in FIGURE 8. A foil unit 24 arranged as shown in FIGURE 8 is, therefore, suitable for propulsion. Such a foil unit includes a distortable unit section 25 which may be of greater length in the direction of fluid flow than if the cell is used primarily for direction control. The distortable section is covered at its leading edge by a leading edge structure 26 and at its trailing edge by a trailing edge structure 27. The nature of the movement of a foil required to effect propulsion is set forth in an article by Dr. T. Yao-Tsu Wu entitled "Swimming of a Waving Plate," which appeared in "Journal of Fluid Mechanics," volume 10, part 3, pp. 321–344, 1961.

Both propulsion control and direction control may be simultaneously accomplished by feeding the impulses or signals for propulsion or direction control for control of movement about different axes into an integrator which in turn is fed into ducts connected with each of the cells as suggested by the block diagram FIGURE 9. The integrating function may be accomplished by connecting the controls to alternate cells. For example, one set of interspersed cells may be connected to a bank control, and the other interspersed set of cells connected to a pitch control with the result that the cells themselves integrate the control signals.

Reference is directed to FIGURE 7. In the previous structures ducts have been indicated as connected to a pressure fluid source within the hull or body or fuselage to which the foil is connected. In some instances, pressure may be derived from the fluid medium in which the foil is immersed. That is, for example, the ducts 11 and 12 illustrated in FIGURES 1 through 4 may terminate in inlet ports 11a and 12a provided in the leading or trailing edge structure 1 whenever the pressure differential it is desired to sense, may exist. If the pressures on opposite sides of the foil in the region of the inlet ports are equal then the foil occupies a neutral position, whereas if these pressures differ, the foil deflects in the appropriate direction as represented by the dotted lines in FIGURE 7.

Having thus described certain embodiments of my invention, I do not wish to be limited thereto but desire to include in the scope of my invention all novelty inherent in the appended claims.

I claim:

1. A foil construction comprising:
    a yieldable covering including flexible walls, the external surfaces of which define the opposite surfaces of said foil;
    a series of elongated tubular self-sustainable cells disposed in side-by-side relation between said flexible walls;
    each cell including a distortable wall tending in response to change in fluid pressure to change the shape of said cells and the opposite flexible walls of said yieldable covering;
    and pressure fluid supplying means to effect change in the shape of said cells thereby to alter the shape of said foil.

2. A foil construction as set forth in claim 1 wherein:
    said cells share common walls and are arranged in two groups at opposite sides of a common median wall;
    and said bendable wall being the wall of each cell opposite from said median wall.

3. A foil construction as set forth in claim 1 wherein:
    said cells are circular in cross section and are longitudinally twistable;
    and said bendable wall includes a twisted Bourdon-tube extending lengthwise of and joined to the ends of each cell.

4. A foil construction as set forth in claim 1 wherein:
    said cells share common walls and are arranged in two groups at opposite side of a common median wall;
    said bendable wall being the wall of each cell opposite from said median wall;
    and said pressure fluid supplying means is operable to establish a pressure differential in said two groups of cells.

5. A foil construction as set forth in claim 1 wherein:
    selected groups of said cells are interconnected to receive pressure fluid;
    and said pressure fluid supplying means is adapted to establish a pressure differential between said groups.

6. A foil construction as set forth in claim 1 wherein said cells are individually connected to said pressure fluid supplying means;
    and said means includes a control to supply fluid at different pressures to said cells.

7. A foil construction as set forth in claim 1 wherein:
    said cells share common walls and are arranged in two groups at opposite sides of a common median wall;
    said bendable wall being the wall of each cell opposite from said median wall;
    and said pressure fluid supplying means includes a conduit communicating between each of said group and the fluid medium in which the foil is immersed.

8. A foil construction, comprising:
    (a) a series of elongated tubular cells having end members and side walls, said cells being joined in side-to-side relation;
    (b) a longitudinally extending member joined to the end members of each cell and forming therein at least one internal wall;

(c) a pair of said walls associated with each cell adapted to be flexed in response to fluid pressure thereby to change the shape of said cell;

(d) and pressure fluid supplying means to effect change in the shape of said cells thereby to change the shape of said foil.

9. A foil construction, as set forth in claim 8 wherein:
(a) said longitudinally extending members are fixed mid-walls joined to those side walls which connect said cells, thereby to divide each cell into a pair of sub-cells;
(b) and said flexible side walls constitute the walls opposite from said mid-walls.

10. A foil construction, as set forth in claim 8 wherein:
(a) said longitudinally extending members are Bourdon tubes twisted to form helices;
(b) and said pairs of flexible walls constitute the opposite sides of said Bourdon tube.

References Cited in the file of this patent

UNITED STATES PATENTS

| | | |
|---|---|---|
| 2,979,287 | Ross | Apr. 11, 1961 |

FOREIGN PATENTS

| | | |
|---|---|---|
| 29,510 | France | May 5, 1925 |
| (1st addition to No. 575,791) | | |
| 816,766 | France | Aug. 17, 1937 |
| 835,221 | Great Britain | May 18, 1960 |